(12) United States Patent
Imada

(10) Patent No.: US 8,104,010 B2
(45) Date of Patent: Jan. 24, 2012

(54) SEMICONDUCTOR INTEGRATED CIRCUIT DESIGN SUPPORTING METHOD, SEMICONDUCTOR INTEGRATED CIRCUIT DESIGN SUPPORTING SYSTEM, AND COMPUTER READABLE MEDIUM

(75) Inventor: Tomohiko Imada, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 522 days.

(21) Appl. No.: 12/266,250

(22) Filed: Nov. 6, 2008

(65) Prior Publication Data

US 2009/0150841 A1    Jun. 11, 2009

(30) Foreign Application Priority Data

Dec. 6, 2007  (JP) .................. 2007-315823

(51) Int. Cl.
   *G06F 17/50* (2006.01)
(52) U.S. Cl. ........................ 716/113; 716/115
(58) Field of Classification Search .............. 716/136, 716/111–115

See application file for complete search history.

(56) References Cited

U.S. PATENT DOCUMENTS

| | | | |
|---|---|---|---|
| 7,698,670 B2 * | 4/2010 | Masumura | 716/106 |
| 7,895,540 B2 * | 2/2011 | Engin et al. | 703/14 |
| 2005/0050502 A1 * | 3/2005 | Kurihara et al. | 716/10 |

FOREIGN PATENT DOCUMENTS

| | | |
|---|---|---|
| JP | 2004-054522 | 2/2004 |
| JP | 2005-038400 | 2/2005 |
| JP | 2005-071267 | 3/2005 |
| JP | 2006-018434 | 1/2006 |

OTHER PUBLICATIONS

Japanese Office Action for Application No. 2007-315823 Mailed on Oct. 11, 2011.

* cited by examiner

*Primary Examiner* — Jack Chiang
*Assistant Examiner* — Binh Tat
(74) *Attorney, Agent, or Firm* — Turocy & Watson, LLP

(57) ABSTRACT

A semiconductor integrated circuit design supporting system has a memory unit which stores cell information containing the number of power supply pads formed at a chip as well as names and the number of a plurality of IO cells, and a drive factor definition file defining a drive factor of each of the plurality of IO cells, a pad laying out section which tentatively lays out the power supply pads and input-output pads corresponding to the IO cells, using the cell information, a package virtual designing section which prepares a package drawing based on coordinates of the power supply pads and the input-output pads, which have been tentatively laid out, an electric characteristics data calculating section which calculates inductance of the power supply pads, using the package drawing, and a noise risk calculating section which calculates noise risk of each of the input-output pads, using the inductance and the drive factor definition file.

17 Claims, 7 Drawing Sheets

| #IO_CELL/ | VSSO | VSSC | VDD25O | VDD25I | VDD33O | VDD33I |
|---|---|---|---|---|---|---|
| B2 | 0.289 | 0.286 | 0.348 | 0.286 | 0 | 0 |
| B4 | 0.631 | 0.358 | 0.706 | 0.358 | 0 | 0 |
| B8 | 0.905 | 0.5 | 1.084 | 0.5 | 0 | 0 |
| IBUF | 0 | 0.3 | 0 | 0.3 | 0 | 0 |

| #PAD | #IOCELL |
|---|---|
| 1 | VSSO |
| 2 | B8 |
| 3 | B8 |
| 4 | IBUF |
| 5 | IBUF |
| 6 | B8 |
| 7 | B8 |
| 8 | B2 |
| 9 | IBUF |
| 10 | IBUF |
| 11 | B8 |
| 12 | VSSO |
| 13 | B2 |
| 14 | B2 |

FIG. 3

| #PAD | #IOCELL | #PKG_L |
|---|---|---|
| 1 | VSSO | 10nH |
| 2 | B8 | |
| 3 | B8 | |
| 4 | IBUF | |
| 5 | IBUF | |
| 6 | B8 | |
| 7 | B8 | |
| 8 | B2 | |
| 9 | IBUF | |
| 10 | IBUF | |
| 11 | B8 | |
| 12 | VSSO | 7nH |
| 13 | B2 | |
| 14 | B2 | |

FIG. 4

| #PAD | #IOCELL | #PKG_L | #Drive_Factor*PKG_L | #Total_Drive |
|---|---|---|---|---|
| 1 | VSSO | 10nH | * | 0 |
| 2 | B8 | | 9.05 | 9.05 |
| 3 | B8 | | 9.05 | 18.1 |
| 4 | IBUF | | 0 | 18.1 |
| 5 | IBUF | | 0 | 18.1 |
| 6 | B8 | | 9.05 | 27.15 |
| 7 | B8 | | 9.05 | 36.2 |
| 8 | B2 | | 2.89 | 39.09 |
| 9 | IBUF | | 0 | 39.09 |
| 10 | IBUF | | 0 | 39.09 |
| 11 | B8 | | 9.05 | 48.14 |
| 12 | VSSO | 7nH | * | 0 |
| 13 | B2 | | 2.023 | 2.023 |
| 14 | B2 | | 2.023 | 4.046 |

F I G. 5

| #PAD | #IOCELL | #PKG_L | #Drive_Factor*PKG_L | #Total_Drive |
|---|---|---|---|---|
| 1 | VSSO | 10nH | * | |
| 2 | B8 | | 6.335 | 33.698 |
| 3 | B8 | | 6.335 | 27.363 |
| 4 | IBUF | | 0 | 21.028 |
| 5 | IBUF | | 0 | 21.028 |
| 6 | B8 | | 6.335 | 21.028 |
| 7 | B8 | | 6.335 | 14.693 |
| 8 | B2 | | 2.023 | 8.358 |
| 9 | IBUF | | 0 | 6.335 |
| 10 | IBUF | | 0 | 6.335 |
| 11 | B8 | | 6.335 | 6.335 |
| 12 | VSSO | 7nH | * | |
| 13 | B2 | | 2.89 | 75.29 |
| 14 | B2 | | 2.89 | 72.4 |

F I G. 6

| #PAD | #IOCELL | #PKG_L | #Noise_Risk |
|---|---|---|---|
| 1 | VSSO | 10nH | 0 |
| 2 | B8 | | 9.05 |
| 3 | B8 | | 18.1 |
| 4 | IBUF | | 18.1 |
| 5 | IBUF | | 18.1 |
| 6 | B8 | | 21.028 |
| 7 | B8 | | 14.693 |
| 8 | B2 | | 8.358 |
| 9 | IBUF | | 6.335 |
| 10 | IBUF | | 6.335 |
| 11 | B8 | | 6.335 |
| 12 | VSSO | 7nH | 0 |
| 13 | B2 | | 2.023 |
| 14 | B2 | | 4.046 |
F I G. 7
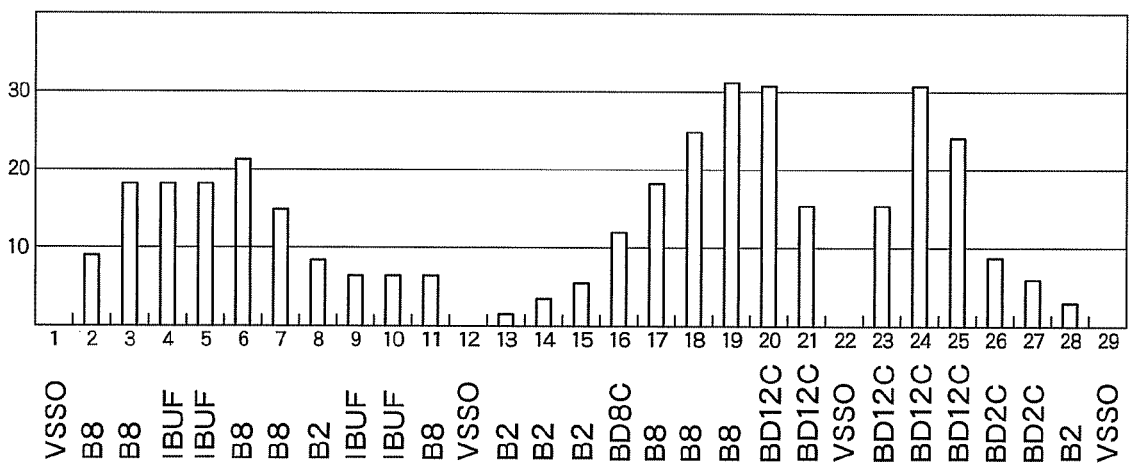
F I G. 8

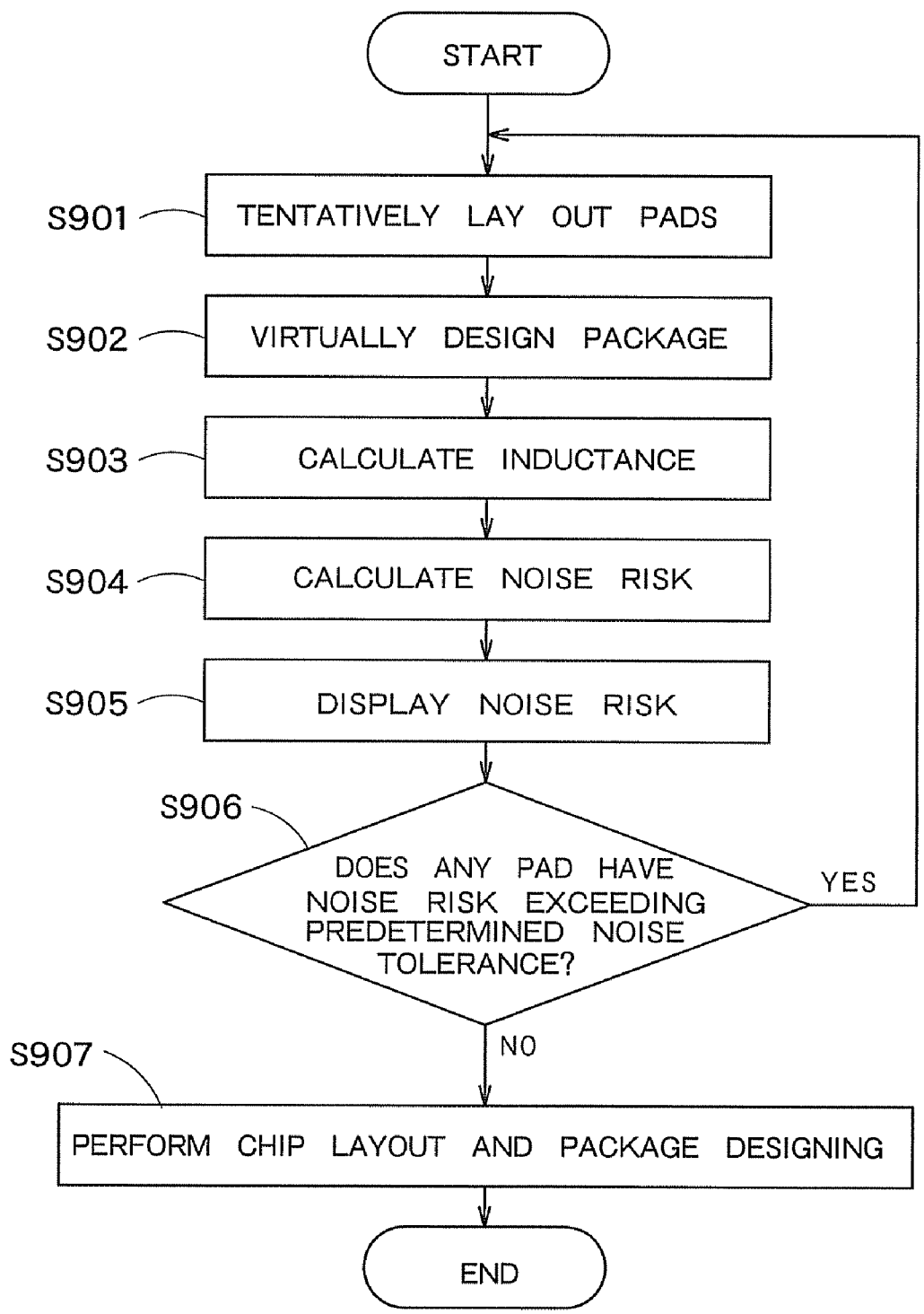
F I G. 9

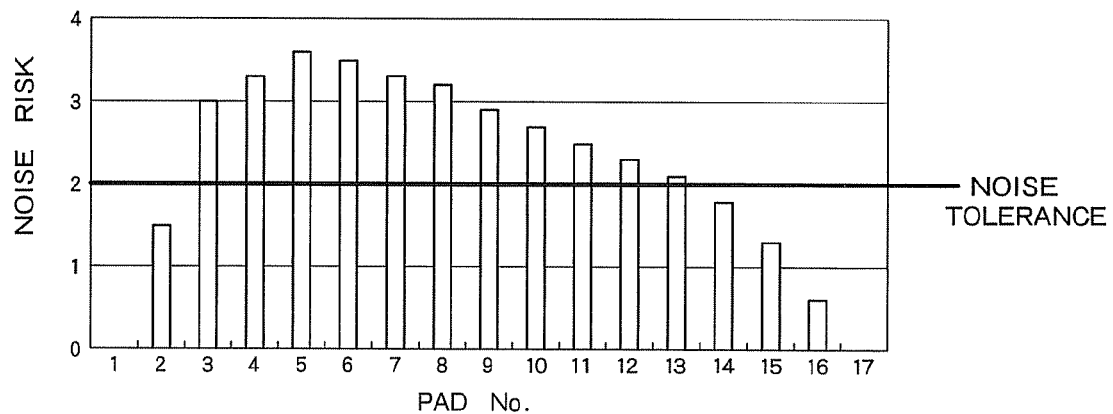
F I G. 10A
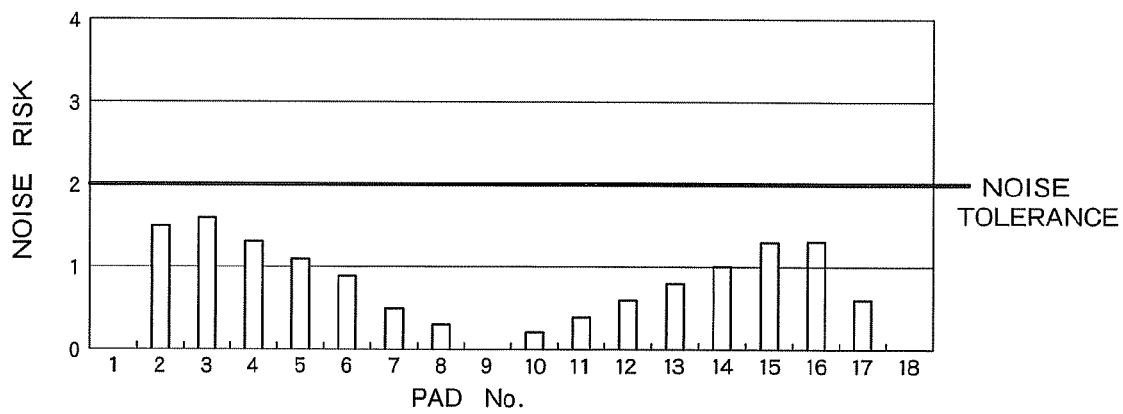
F I G. 10B

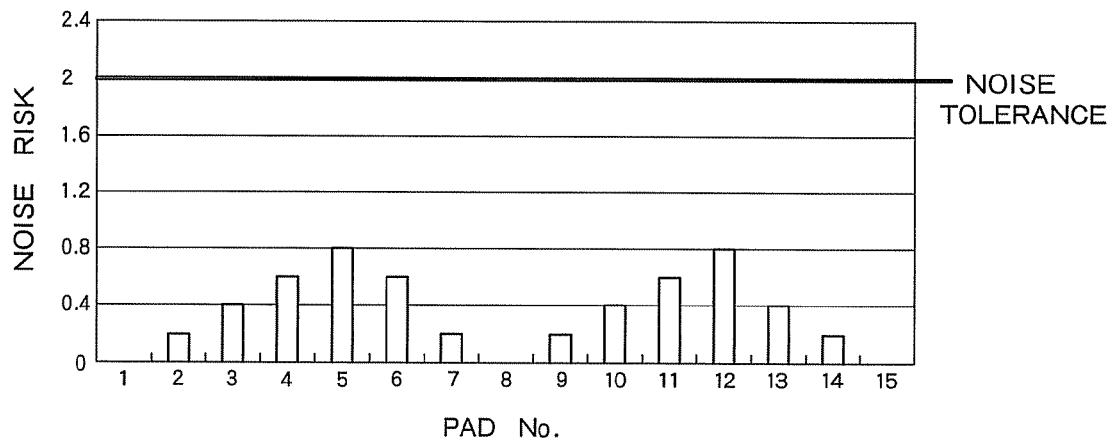
F I G. 11A
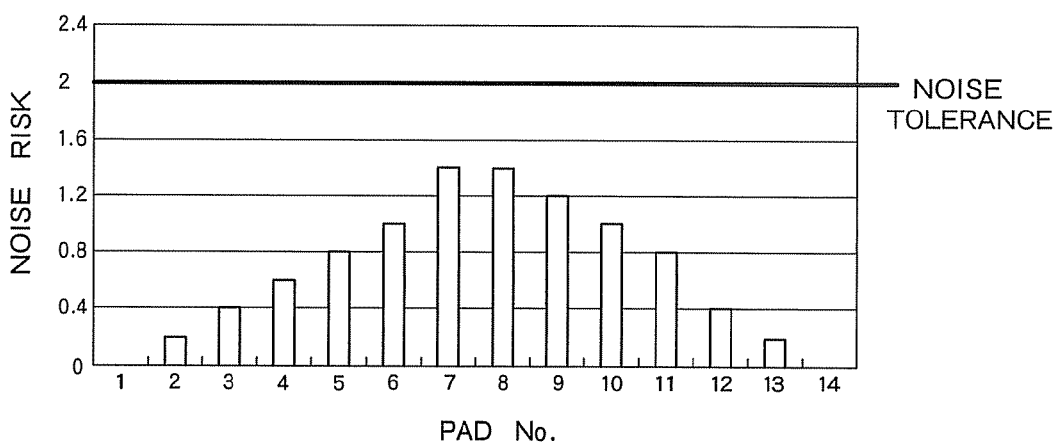
F I G. 11B

SEMICONDUCTOR INTEGRATED CIRCUIT DESIGN SUPPORTING METHOD, SEMICONDUCTOR INTEGRATED CIRCUIT DESIGN SUPPORTING SYSTEM, AND COMPUTER READABLE MEDIUM

CROSS REFERENCE TO RELATED APPLICATIONS

This application is based upon and claims the benefit of priority from the Japanese Patent Application No. 2007-315823, filed on Dec. 6, 2007, the entire contents of which are incorporated herein by reference.

BACKGROUND OF THE INVENTION

The present invention relates to a semiconductor integrated circuit design supporting method, a semiconductor integrated circuit design supporting system, and a computer readable medium.

A semiconductor integrated circuit device includes a semiconductor chip (die) on which logic circuits are mounted, and a semiconductor package covering the semiconductor chip. Widely used semiconductor packages include those which enable high-density packaging, such as a BGA (ball grid array) package or a PGA (pin grid array) package, for a circuit board to be incorporated into electronic equipment.

In LSI devices, when a plurality of output terminals are simultaneously involved in an operation change from a low level to a high level or vice versa, charge/discharge current of output load capacity instantly flows through a power supply and a ground line. Depending on the magnitude of the current, noise, which is so-called "simultaneous switching noise", may be caused in the power supply and the grounding line.

To take measure for the simultaneous switching noise, the number of pads required for the entire chip has been estimated by multiplying a drive factor of an IO cell with an inductance coefficient of a package, summing up the obtained products, and dividing the sum by a noise tolerance for one power supply pin.

However, neither a method has been established yet for properly laying out such power supply pads after the estimation of a required number of pads, nor a tool has been provided for examining the risk of the simultaneous switching noise. Under such circumstances, analysis for signals/power supply is obliged to be carried out after completing chip layout and package designing. In this case, if a problem of the simultaneous switching is found out, the layout of the power supply pads has to be changed to again carry out chip layout and package designing. Thus, it has been a problem that the time required for designing is prolonged.

SUMMARY OF THE INVENTION

According to one aspect of the present invention, there is provided a semiconductor integrated circuit design supporting method, the method using a circuit design supporting system comprising: a memory unit which stores cell information that contains the number of power supply pads formed at a chip as well as names and the number of a plurality of IO cells, and a drive factor definition file that defines a drive factor of each of the plurality of IO cells; a pad laying out section; a package virtual designing section; an electric characteristics data calculating section; and a noise risk calculating section, the method comprising:

tentatively laying out the power supply pads and input-output pads corresponding to the IO cells, using the cell information, with the aid of the pad laying out section;

preparing a package drawing based on coordinates of the power supply pads and the input-output pads, with the aid of the package virtual designing section;

calculating inductance of the power supply pads, using the package drawing, with the aid of the electric characteristics data calculating section; and calculating noise risk of each of the input-output pads, using the inductance of the power supply pads and the drive factor definition file, with the aid of the noise risk calculating section.

According to one aspect of the present invention, there is provided a semiconductor integrated circuit design supporting system comprising:

a memory unit which stores cell information containing the number of power supply pads formed at a chip as well as names and the number of a plurality of IO cells, and a drive factor definition file defining a drive factor of each of the plurality of IO cells;

a pad laying out section which tentatively lays out the power supply pads and input-output pads corresponding to the IO cells, using the cell information;

a package virtual designing section which prepares a package drawing based on coordinates of the power supply pads and the input-output pads, which have been tentatively laid out;

an electric characteristics data calculating section which calculates inductance of the power supply pads, using the package drawing; and a noise risk calculating section which calculates noise risk of each of the input-output pads, using the inductance and the drive factor definition file.

According to one aspect of the present invention, there is provided a computer readable medium storing a semiconductor integrated circuit design supporting program, wherein the semiconductor integrated circuit design supporting program causes a computer to execute the steps of:

tentatively laying out power supply pads and input-output pads corresponding to a plurality of IO cells, using cell information containing the number of the power supply pads formed at a chip as well as names and the number of the IO cells, with the aid of a pad laying out section;

preparing a package drawing based on coordinates of the power supply pads and the input-output pads, with the aid of a package virtual designing section;

calculating inductance of the power supply pads, using the package drawing, with the aid of an electric characteristics data calculating section; and calculating noise risk of each of the input-output pads, using the inductance of the power supply pads and a drive factor definition file defining a drive factor of each of the plurality of IO cells, with the aid of a noise risk calculating section.

BRIEF DESCRIPTION OF THE DRAWINGS

FIG. 3 is a view showing an example of layout information;

FIG. 4 is a view showing an example of layout information with an addition of inductance data;

FIG. 5 is a view showing a method for calculating noise risk;

FIG. 6 is a view showing a method for calculating noise risk;

FIG. 7 is a view showing an example of layout information with an addition of noise risk data;

FIG. 8 is a view showing an example in which noise risk is indicated by a bar graph;

FIG. 9 is a flow diagram illustrating a method for examining noise risk;

FIG. 10A is a view showing an example of noise risk in individual pads before adding power supply pads;

FIG. 10B is a view showing an example of noise risk in individual pads after adding power supply pads;

FIG. 11A is a view showing an example of noise risk in individual pads before removing power supply pads; and FIG. 11B is a view showing an example of noise risk in individual pads after removing power supply pads.

DETAILED DESCRIPTION OF THE INVENTION

Figures 1, 2:
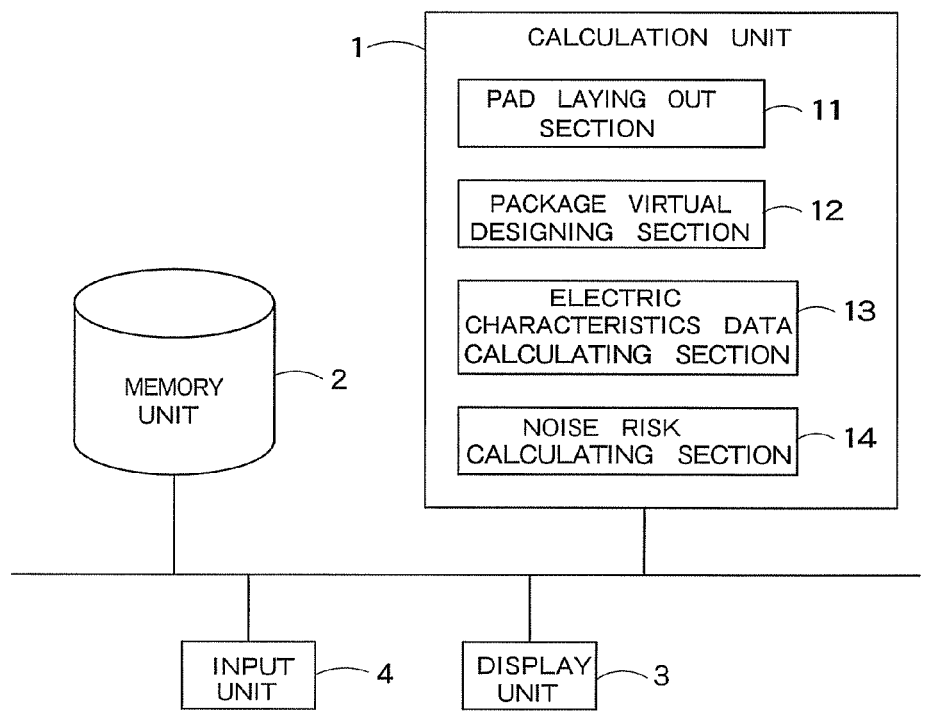
FIG. 1 is a schematic diagram illustrating a design supporting system for semiconductor integrated circuit, according to an embodiment of the present invention.
FIG. 2 is a view showing an example of a drive factor definition file for every IO cell.

With reference to the drawings, hereinafter will be described an embodiment of the present invention.

FIG. 1 is a schematic diagram illustrating a design supporting system for semiconductor integrated circuit, according to an embodiment of the present invention. The design supporting system includes a calculation unit 1, a memory unit 2, a display unit 3 and an input unit 4. The memory unit 2 stores cell information and a drive factor definition file.

The cell information contains names and the number of IO cells, as well as the number of power supply pads required for an entire chip. The number of power supply pads required for an entire chip is estimated in advance using a known method. As shown in FIG. 2, the drive factor definition file defines a drive factor for every IO cell by the type of power supply.

The calculation unit 1 has a pad laying out section 11, a package virtual designing section 12, an electric characteristics data calculating section 13 and a noise risk calculating section 14.

The pad laying out section 11 tentatively lays out power supply pads and signal input-output pads, using the cell information stored in the memory unit 2. Thus, layout information shown in FIG. 3 is prepared, containing pads and names of IO cells corresponding to the pads.

The package virtual designing section 12 conducts a study of bonding layout or wiring feasibility of a package (conducts virtual designing of a package) based on the coordinates of the pads that have been tentatively laid out, and prepares a package drawing.

The electric characteristics data calculating section 13 calculates electric characteristics data for each of the power supply pads, using the prepared package drawing. In the present embodiment, package inductance having a great influence on the simultaneous switching noise is calculated as the electric characteristics data. Thus, as shown in FIG. 4, the layout information is prepared with an addition of inductance data (the row of "#PKG_L") of the power supply pads.

The noise risk calculating section 14 calculates noise risk of each of the signal input-output pads, using the package inductance calculated by the electric characteristics data calculating section 13 and the drive factors of each of the IO cells.

The following is an explanation on a method for calculating noise risk. The explanation here is made, referring to FIGS. 2 and 4, on a method for calculating noise risk of a ground (VSSO) pin for output IO.

First, for each of the signal input-output pads of pad number (#PAD) 2 to pad number (#PAD) 11, a product of the drive factor of "VSSO" (values in the row of "VSSO" in FIG. 2) and the inductance (10 nH) of the power supply pad of #PAD 1 is calculated. Similar calculation is carried out for each of the pads starting from #PAD 13 to the subsequently laid out VSSO, using the inductance (7 nH) of the power supply pad of #PAD 12. This process is sequentially repeated. As a result, the values as shown in the row of "#Drive_Factor*PKG_L" in FIG. 5 are obtained.

For example, for #PAD 2, a relation 0.905×10 (nH)=9.05 is established. Also, for #PAD 14, a relation 0.289×7 (nH)=2.023 is established.

Then, each of the calculated values is sequentially added up in the numerical order of the pads. Specifically, the process is performed in such a way that, with the turn of a power supply pad, the integrated value is reset to zero, and then each of the values up to the next power supply pad is added up in a similar manner. Thus, the values shown in the row of "#Total_Drive" in FIG. 5 are obtained.

Subsequently, the similar calculation is performed in an order reversed from that of the calculation performed in FIG. 5. Specifically, a product of the inductance of a power supply pad of #PAD 12 and each of the drive factors of VSSO for #PAD 2 to #PAD 11 is calculated (the row of "#Drive_Factor*PKG_L" in FIG. 6). Then, each of the calculated values is added up from #PAD 11 to #PAD 2 (the row of "#Total_Drive" in FIG. 6).

Of the integrated values ("#Total_Drive") calculated using the two processes, a smaller integrated value is extracted as a scale of noise risk of each signal input-output pad. Noise risk of the pads as derived from FIGS. 5 and 6 is shown in FIG. 7.

The noise risk calculating section 14 permits the display unit 3 to indicate the noise risk of the signal input-output pads calculated in this way. For the user's visual understanding, the noise risk is indicated using a graph, for example. FIG. 8 shows an example of an indication of the noise risk using a bar graph.

The user may refer to the noise risk indicated on the display unit 3 to instruct addition, removal or positional change of the power supply pads through the input unit 4. According to the instructions, the pad laying out section 11 again tentatively lays out the pads.

For example, let us assume that the noise risk of "n" number ("n" is an integer of 2 or more) of input-output pads between a first power supply pad and a second power supply pad is sufficiently small, and that the noise risk of at least one of "m" number ("m" is an integer of 2 or more) of input-output pads between the second power supply pad and a third power supply pad exceeds a predetermined noise tolerance. In this case, the position of the second power supply pad is instructed to be changed to the side of the third power supply pad. According to the instructions, the pad laying out section 11 again tentatively lays out the pads. With the completion of the second tentative layout of the pads, the number of input-output pads between the first and second power supply pads turns to be "n+k" ("k" is an integer satisfying "1≦k≦m−1"), and the number of input-output pads between the second and third power supply pads turns to be "m−k".

In this way, the design supporting system according to the present embodiment can examine the risk of the simultaneous switching noise at the initial stage of designing, based on the positions of the power supply pads, which will help reduce the number of backtracking processes in a design flow. Accordingly, the time and cost required for designing can be reduced.

Also, conducting examination in consideration of the electric characteristics of the package may contribute to suppressing excess and deficiency of power supply pads to be laid out. In this way, an optimal chip size can be estimated.

Referring now to a flow diagram illustrated in FIG. 9, an explanation hereinafter will be given on a method for examining noise risk using the design supporting system.

(Step S901) The pad laying out section 11 tentatively lays out pads, using the cell information stored in the memory unit 2.

(Step S902) The package virtual designing section 12 virtually designs a package, using the coordinates of the tentatively laid out pads, and prepares a package drawing.

(Step S903) The electric characteristics data calculating section 13 calculates an inductance of each of the power supply pads, using the prepared package drawings.

(Step S904) The noise risk calculating section 14 calculates noise risk of each of the signal input-output pads, using package inductance and drive factor of each of the IO cells.

(Step S905) The display unit 3 indicates the calculated noise risk.

(Step S906) Detection is made as to the presence of pads whose noise risk exceeds a predetermined noise tolerance. If "YES", control returns to step S901 where the pad laying out section 11 again tentatively lays out the pads. In this case, the cell information stored in the memory unit 2 may be renewed, and the number of the power supply pads may be increased.

For example, if the noise risk of a lot of pads between certain power supply pads (between #PAD 1 and #PAD 17 here) exceeds a predetermined noise tolerance (2 here) as shown in FIG. 10A, an addition of a power supply pad to #PAD 9 as shown in FIG. 10B can suppress the noise risk to a level equal to or less than the noise tolerance.

If none of the pads has the noise risk exceeding the noise tolerance, control proceeds to step S907.

(Step S907) Chip layout and package designing are performed.

In this way, the risk of the simultaneous switching noise can be examined based on the positions of the power supply pads at the initial stage of designing, prior to proceeding to chip layout and package designing. Thus, the number of backtracking processes can be reduced in the design flow, which will lead to the reduction in the time and cost required for designing.

In the case where the user determines, at step S906, that the power supply pads are excessively laid out, even if none of the pads has noise risk exceeding a predetermined noise tolerance, control may be ensured to return to step S901 to have the pad laying out section 11 tentatively laid out the pads. In this case, the user is to renew the cell information stored in the memory unit 2 and reduce the number of power supply pads, through the input unit 4.

For example, the number of the power supply pads may be reduced, if the noise risk of the pads is as shown in FIG. 11A and if removal of #PAD 8 will not allow the noise risk of the pads to exceed a predetermined noise tolerance (2 here) as shown in FIG. 11B.

Conducting examination in consideration of the electric characteristics of the package may contribute to suppressing excess and deficiency of power supply pads to be laid out. In this way, an optimal chip size can be estimated.

As described above, by performing tentative layout of pads and virtual designing of package, the present embodiment enables calculation of the noise risk of each of the pads with high accuracy, and enables examination of the risk of the simultaneous switching noise at an initial stage of designing. Thus, the number of backtracking processes can be reduced in the design flow, which will lead to the reduction in the time and cost required for the designing.

At least a part of the design supporting system explained in the embodiment described above may be configured with hardware or software. In the case where the system is configured with software, a program that will realize at least a part of the function of the design supporting system may be stored in a recording medium such as a flexible disk or a CD-ROM, so as to be read out by a computer for execution. The recording medium is not limited to a detachable one, such as a magnetic or optical disk, but may be a fixed type recording medium, such as a hard disk drive or a memory.

Also, a program that realizes at least a part of the function of the design supporting system may be distributed through a telecommunication line (including radio communication), such as an internet. Alternatively, the program may be distributed through wired or radio communications such as an internet or may be distributed being stored in a recording medium, in a state of being encrypted, modulated or compressed.

What is claimed is:

1. A semiconductor integrated circuit design supporting method, the method using a circuit design supporting system comprising: a memory unit which stores cell information that contains the number of power supply pads formed at a chip as well as names and the number of a plurality of IO cells, and a drive factor definition file that defines a drive factor of each of the plurality of IO cells; a pad laying out section; a package virtual designing section; an electric characteristics data calculating section; and a noise risk calculating section, the method comprising:

tentatively laying out the power supply pads and input-output pads corresponding to the IO cells, using the cell information, with the aid of the pad laying out section;

preparing a package drawing based on coordinates of the power supply pads and the input-output pads, with the aid of the package virtual designing section;

calculating inductance of the power supply pads, using the package drawing, with the aid of the electric characteristics data calculating section; and calculating noise risk of each of the input-output pads, using the inductance of the power supply pads and the drive factor definition file, with the aid of the noise risk calculating section, wherein:

the noise risk calculating section uses an inductance of a first power supply pad, an inductance of a second power supply pad, and a drive factor of each of "n" number ("n" is an integer of 2 or more) of input-output pads laid out between the first and second power supply pads to:

calculate a first product by multiplying the drive factor of each of the "n" number of input-output pads with the inductance of the first power supply pad;

calculate a first integrated value for each of the "n" number of input-output pads by sequentially adding up the first product, starting from the side of the first power supply pad;

calculate a second product by multiplying the drive factor of each of the "n" number of input-output pads with the inductance of the second power supply pad;

calculate a second integrated value for each of the "n" number of input-output pads by sequentially adding up the second product, starting from the side of the second power supply pad; and compare the first and second integrated values for each of the "n" number of input-output pads for extraction of a smaller one as the noise risk, wherein the calculations are performed by a computer.

2. The semiconductor integrated circuit design supporting method according to claim 1, wherein the number of the power supply pads contained in the cell information is increased, if at least one of the "n" number of input-output pads has the noise risk exceeding a predetermined noise tolerance.

3. The semiconductor integrated circuit design supporting method according to claim 2, wherein the pad laying out section lays out a third power supply pad between the first and second power supply pads.

4. The semiconductor integrated circuit design supporting method according to claim 1, wherein:
the noise risk calculating section uses an inductance of a first power supply pad, an inductance of a second power supply pad, an inductance of a third power supply pad, a drive factor of each of "n" number ("n" is an integer of 2 or more) of input-output pads laid out between the first and second power supply pads, and a drive factor of each of "m" number ("m" is an integer of 2 or more) of input-output pads laid out between the second and third power supply pads to calculate noise risk of each of the "n" and "m" numbers of input-output pads; and
the number of the power supply pads contained in the cell information is reduced if the noise risk of each of the "n" and "m" numbers of input-output pads is equal to or less than a predetermined noise tolerance.

5. The semiconductor integrated circuit design supporting method according to claim 4, wherein the pad laying out section removes the second power supply pad.

6. The semiconductor integrated circuit design supporting method according to claim 1, wherein:
the noise risk calculating section uses an inductance of a first power supply pad, an inductance of a second power supply pad, an inductance of a third power supply pad, a drive factor of each of "n" number ("n" is an integer of 2 or more) of input-output pads laid out between the first and second power supply pads, and a drive factor of each of "m" number ("m" is an integer of 2 or more) of input-output pads laid out between the second and third power supply pads to calculate noise risk of each of the "n" and "m" numbers of input-output pads; and
the pad laying out section changes a position of the second power supply pad to the side of the third power supply pad, so that the number of the input-output pads laid out between the first and second power supply pads turns to "n+k" ("k" is an integer satisfying "$1 \leq k \leq m-1$") and that the number of the input-output pads laid out between the second and third power supply pads turns to "m−k", if the noise risk of each of the "n" number of input-output pads is equal to or less than a predetermined noise tolerance and if the noise risk of at least one of the "m" number of input-output pads exceeds the predetermined noise tolerance.

7. A semiconductor integrated circuit design supporting system comprising:
a memory unit which stores cell information containing the number of power supply pads formed at a chip as well as names and the number of a plurality of IO cells, and a drive factor definition file defining a drive factor of each of the plurality of IO cells;
a pad laying out section which tentatively lays out the power supply pads and input-output pads corresponding to the IO cells, using the cell information;
a package virtual designing section which prepares a package drawing based on coordinates of the power supply pads and the input-output pads, which have been tentatively laid out;
an electric characteristics data calculating section which calculates inductance of the power supply pads, using the package drawing; and
a noise risk calculating section which calculates noise risk of each of the input-output pads, using the inductance and the drive factor definition file, wherein:
the noise risk calculating section uses an inductance of a first power supply pad, an inductance of a second power supply pad, and a drive factor of each of "n" number ("n" is an integer of 2 or more) of input-output pads laid out between the first and second power supply pads to:
calculate a first product by multiplying the drive factor of each of the "n" number of input-output pads with the inductance of the first power supply pad;
calculate a first integrated value for each of the "n" number of input-output pads by sequentially adding up the first product, starting from the side of the first power supply pad;
calculate a second product by multiplying the drive factor of each of the "n" number of input-output pads with the inductance of the second power supply pad;
calculate a second integrated value for each of the "n" number of input-output pads by sequentially adding up the second product, starting from the side of the second power supply pad; and
compare the first and second integrated values for each of the "n" number of input-output pads for extraction of a smaller one as the noise risk.

8. The semiconductor integrated circuit design supporting system according to claim 7, wherein the pad laying out section lays out a third power supply pad between the first and second power supply pads, if at least one of the "n" number of input-output pads has the noise risk exceeding a predetermined noise tolerance.

9. The semiconductor integrated circuit design supporting system according to claim 8, wherein the system further comprises an input unit through which instructions for increasing the number of power supply pads are given, so that the number of the power supply pads contained in the cell information stored in the memory unit is increased based on the instructions for increasing the number of power supply pads.

10. The semiconductor integrated circuit design supporting system according to claim 7, wherein:
the noise risk calculating section uses an inductance of a first power supply pad, an inductance of a second power supply pad, an inductance of a third power supply pad, a drive factor of each of "n" number ("n" is an integer of 2 or more) of input-output pads laid out between the first and second power supply pads, and a drive factor of each of "m" number ("m" is an integer of 2 or more) of input-output pads laid out between the second and third power supply pads, to calculate noise risk of each of the "n" and "m" numbers of input-output pads; and
the pad laying out section removes the second power supply pad, if the noise risk of each of the "n" and "m" numbers of input-output pads is equal to or less than a predetermined noise tolerance.

11. The semiconductor integrated circuit design supporting system according to claim 10, wherein the system further comprises an input unit through which instructions for decreasing the number of power supply pads are given, so that the number of the power supply pads contained in the cell information stored in the memory unit is decreased based on the instructions for decreasing the number of power supply pads.

12. The semiconductor integrated circuit design supporting system according to claim 7, wherein:

the noise risk calculating section uses an inductance of a first power supply pad, an inductance of a second power supply pad, an inductance of a third power supply pad, a drive factor of each of "n" number ("n" is an integer of 2 or more) of input-output pads laid out between the first and second power supply pads, and a drive factor of each of "m" number ("m" is an integer of 2 or more) of input-output pads laid out between the second and third power supply pads, to calculate noise risk of each of the "n" and "m" numbers of input-output pads; and the pad laying out section changes a position of the second power supply pad to the side of the third power supply pad, so that the number of the input-output pads laid out between the first and second power supply pads turns to "n+k" ("k" is an integer satisfying "1≦k≦m−1") and that the number of the input-output pads laid out between the second and third power supply pads turns to "m−k", if the noise risk of each of the "n" number of input-output pads is equal to or less than a predetermined noise tolerance and if the noise risk of at least one of the "m" number of input-output pads exceeds the predetermined noise tolerance.

13. The semiconductor integrated circuit design supporting system according to claim 7, wherein the system further comprises a display unit which indicates the noise risk of each of the input-output pads.

14. A non-transitory computer readable medium storing a semiconductor integrated circuit design supporting program, wherein the semiconductor integrated circuit design supporting program causes a computer to execute the steps of:

tentatively laying out power supply pads and input-output pads corresponding to a plurality of IO cells, using cell information containing the number of the power supply pads formed at a chip as well as names and the number of the IO cells, with the aid of a pad laying out section;

preparing a package drawing based on coordinates of the power supply pads and the input-output pads, with the aid of a package virtual designing section;

calculating inductance of the power supply pads, using the package drawing, with the aid of an electric characteristics data calculating section; and calculating noise risk of each of the input-output pads, using the inductance of the power supply pads and a drive factor definition file defining a drive factor of each of the plurality of IO cells, with the aid of a noise risk calculating section, wherein the step of calculating noise risk uses an inductance of a first power supply pad, an inductance of a second power supply pad, and a drive factor of each of "n" number ("n" is an integer of 2 or more) of input-output pads laid out between the first and second power supply pads to:

calculate a first product by multiplying the drive factor of each of the "n" number of input-output pads with the inductance of the first power supply pad;

calculate a first integrated value for each of the "n" number of input-output pads by sequentially adding up the first product, starting from the first power supply pad;

calculate a second product by multiplying the drive factor of each of the "n" number of input-output pads with the inductance of the second power supply pad;

calculate a second integrated value for each of the "n" number of input-output pads by sequentially adding up the second product starting from the second power supply pad; and compare the first and second integrated values for each of the "n" number of input-output pads for extraction of a smaller value as the noise risk.

15. The non-transitory computer readable medium according to claim 14, wherein the semiconductor integrated circuit design supporting program causes a computer to execute a step of laying out a third power supply pad between the first and second power supply pads, with the aid of the pad laying out section, if the noise risk of at least one of the "n" number of input-output pads exceeds a predetermined noise tolerance.

16. The non-transitory computer readable medium according to claim 14, wherein the semiconductor integrated circuit design supporting program causes a computer to execute the steps of:

calculating noise risk of each of "n" number ("n" is an integer of 2 or more) of input-output pads and "m" number ("m" is an integer of 2 or more) of input-output pads, using an inductance of a first power supply pad, an inductance of a second power supply pad, an inductance of a third power supply pad, a drive factor of each of the "n" number of input-output pads laid out between the first and second power supply pads, and a drive factor of each of the "m" number of input-output pads laid out between the second and third power supply pads, with the aid of the noise risk calculating section; and removing the second power supply pad, if the noise risk of each of the "n" and "m" numbers of input-output pads is equal to or less than a predetermined noise tolerance, with the aid of the pad laying out section.

17. The non-transitory computer readable medium according to claim 14, wherein the semiconductor integrated circuit design supporting program causes a computer to execute the steps of:

calculating noise risk of each of "n" number ("n" is an integer of 2 or more) of input-output pads and "m" number ("m" is an integer of 2 or more) of input-output pads, using an inductance of a first power supply pad, an inductance of a second power supply pad, an inductance of a third power supply pad, a drive factor of each of the "n" number of input-output pads laid out between the first and second power supply pads, and a drive factor of each of the "m" number of input-output pads laid out between the second and third power supply pads, with the aid of the noise risk calculating section; and changing a position of the second power supply pad to the side of the third power supply pad, so that the number of the input-output pads laid out between the first and second power supply pads turns to "n+k" ("k" is an integer satisfying "1≦k≦m−1") and that the number of the input-output pads laid out between the second and third power supply pads turns to "m−k", if the noise risk of each of the "n" number of input-output pads is equal to or less than a predetermined noise tolerance and if the noise risk of at least one of the "m" number of input-output pads exceeds the predetermined noise tolerance, with the aid of the pad laying out section.

* * * * *